US012706944B2

(12) United States Patent
Norrie

(10) Patent No.: US 12,706,944 B2
(45) Date of Patent: Aug. 11, 2026

(54) CYBERSECURITY SYSTEM HAVING A CHATBOT

(71) Applicant: CyberConIQ, Inc., York, PA (US)

(72) Inventor: James Norrie, York, PA (US)

(73) Assignee: CyberConIQ International Corp., Vancouver (CA)

( * ) Notice: Subject to any disclaimer, the term of this patent is extended or adjusted under 35 U.S.C. 154(b) by 81 days.

(21) Appl. No.: 18/538,162

(22) Filed: Dec. 13, 2023

(65) Prior Publication Data

US 2025/0202929 A1 Jun. 19, 2025

(51) Int. Cl.
*H04L 9/00* (2022.01)
*G06F 40/40* (2020.01)
*H04L 9/40* (2022.01)
*H04L 51/02* (2022.01)

(52) U.S. Cl.
CPC .......... *H04L 63/1441* (2013.01); *G06F 40/40* (2020.01); *H04L 63/1416* (2013.01); *H04L 63/1433* (2013.01); *H04L 51/02* (2013.01)

(58) Field of Classification Search
CPC ............. H04L 63/1441; H04L 63/1416; H04L 63/1433; H04L 51/02; G06F 40/40
See application file for complete search history.

(56) References Cited

U.S. PATENT DOCUMENTS 10,834,079 B2 11/2020 Trim et al.
12,069,010 B1 * 8/2024 Elson ...................... G06F 40/20
2018/0137401 A1 5/2018 Kumar et al.
2021/0150150 A1 * 5/2021 Wu ......................... G06F 40/35
2021/0234891 A1 7/2021 Benishti
(Continued)

FOREIGN PATENT DOCUMENTS

IN 201941002943 1/2019
JP 2025051917 A * 4/2025
KR 102390412 B1 4/2022

OTHER PUBLICATIONS

Sentonas, M., Endpoint & Cloud Security, Introducing Charlotte AI, CrowdStrike's Generative AI Security Analyst: Ushering in the Future of AI-Powered Cybersecurity, dated May 30, 2023, 5 pages.
(Continued)

*Primary Examiner* — Syed M Ahsan
(74) *Attorney, Agent, or Firm* — Barley Snyder

(57) ABSTRACT

A cybersecurity system includes a query module receiving a cybersecurity query from a user and identifying a user record corresponding to the user, a chatbot module, and a natural language module connected to the chatbot module and using natural language processing with reference to a plurality of cybersecurity information sources to determine a reply to the cybersecurity query in a natural language format. The user record includes a cybersecurity style associated with the user that is predetermined and pre-stored in the user record. The cybersecurity style represents a plurality of personality traits of the user that are indicative of a cybersecurity risk posed by the user. The chatbot module receives the cybersecurity query and the cybersecurity style of the user. The chatbot module adjusts the reply according to the cybersecurity style of the user and outputs the reply to the user.

20 Claims, 3 Drawing Sheets

(56) References Cited

U.S. PATENT DOCUMENTS

2024/0281706 A1* 8/2024 Marzinzik ............... G10L 15/22
2024/0378306 A1* 11/2024 Lyle .................... G06F 21/6218

OTHER PUBLICATIONS

He, J., et al., Developing an AI-Powered Chatbot to Support the Administration of Middle and High School Cybersecurity Camps, Journal of Cybersecurity Education, Research and Practice, vol. 2021, No. 1, Article 6, dated Jul. 2021.
Buck, B., Meet Lookout Sail: A Generative AI Tailored For Your Security Operations/Lookout, dated Aug. 10, 2023, available at https://www.lookout.com/blog/lookout-sail-generative-ai#/introducing-lookout-sail, 14 pages.

* cited by examiner

CYBERSECURITY SYSTEM HAVING A CHATBOT

FIELD OF THE INVENTION

The present invention relates to cybersecurity and, more particularly, to a system and method for using a chatbot to reply to a cybersecurity query.

BACKGROUND

Cybersecurity is a critical concern for organizations. Organizations are often most prone to cybersecurity breaches through attacks that target individuals working in the organization. For example, phishing, spear phishing, social engineering, and other forms of third-party cyber-attacks deceive individuals of the organization, as opposed to overcoming technological and computer-based barriers, as a means of gaining illegitimate access to critical data or other assets of the organization.

Foreknowledge and in-the moment awareness of the users or individuals in an organization regarding their handling of these cybersecurity threat types and strategies is key to preventing breaches. Due to the sophistication and variation in cybersecurity threats, users may often be unsure of whether a cybersecurity threat is really present or how to handle the threat. The user may also be hesitant to check with others in their organization for fear or embarrassment of being unknowledgeable or unaware. Searching for information on the internet regarding the handling of specific threats often can only provide general advice that may not be applicable to the particular threat or may not be presented in a manner that the user can easily understand or even further compromise organization security by public sharing of protected information that should not be disclosed outside of the organization itself.

SUMMARY

A cybersecurity system includes a query module receiving a cybersecurity query from a user and identifying a user record corresponding to the user, a chatbot module, and a natural language module connected to the chatbot module and using natural language processing with reference to a plurality of cybersecurity information sources to determine a reply to the cybersecurity query in a natural language format. The user record includes a cybersecurity style associated with the user that is predetermined and pre-stored in the user record. The cybersecurity style represents a plurality of personality traits of the user that are indicative of a cybersecurity risk posed by the user. The chatbot module receives the cybersecurity query and the cybersecurity style of the user. The chatbot module adjusts the reply according to the cybersecurity style of the user and outputs the reply to the user.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
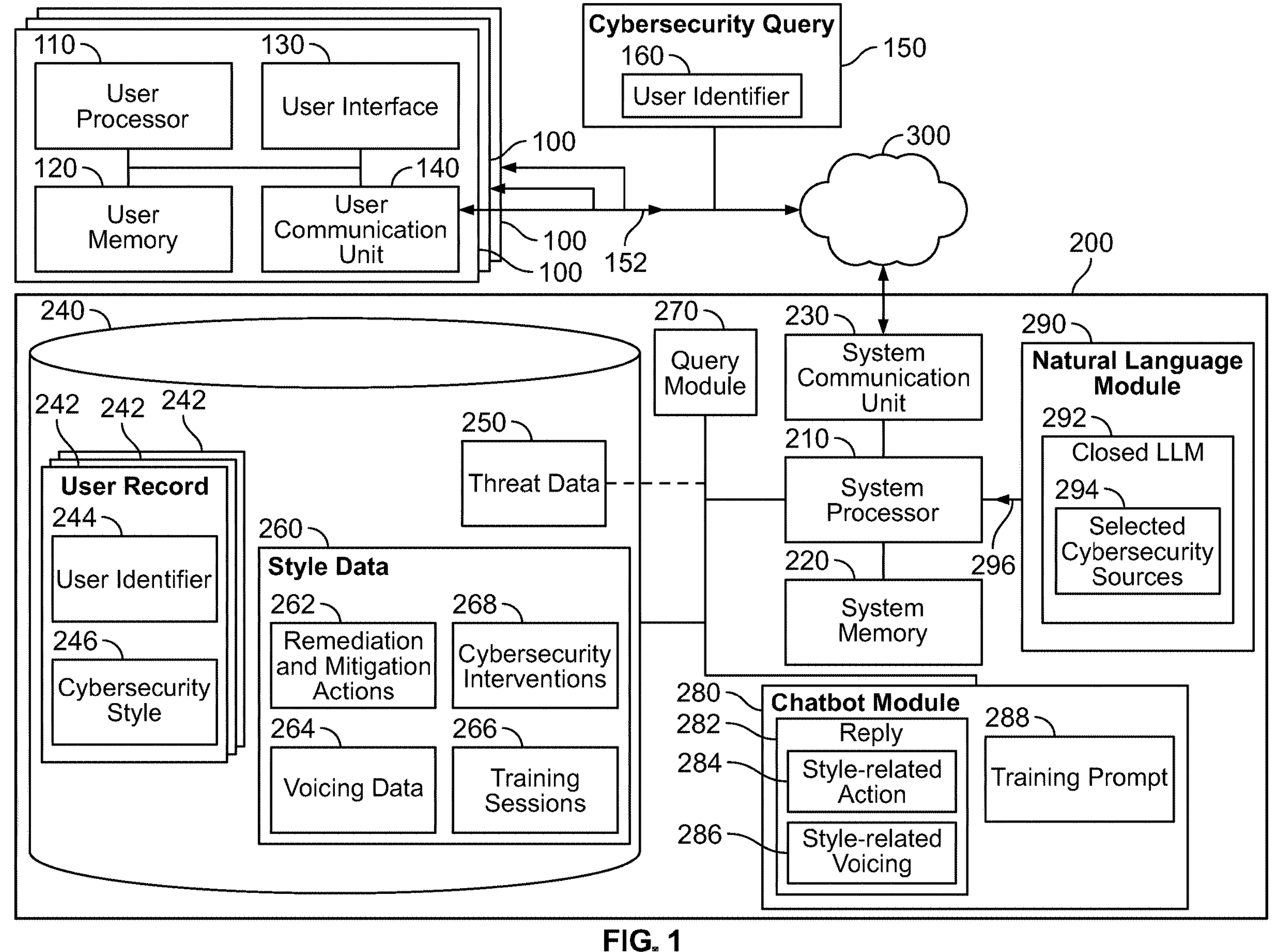
FIG. 1 is a block diagram of a system for providing cybersecurity guidance and implementing cybersecurity interventions that includes a cybersecurity system and a plurality of users.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept to those skilled in the art.

A system for providing cybersecurity guidance and implementing cybersecurity interventions, according to an embodiment shown in FIG. 1, includes a plurality of users 100 and a cybersecurity system 200 communicating with the users 100 over a network 300. The network 300 may be the Internet or may be a local network of an organization.

The plurality of users 100, as shown in FIG. 1, each have a device that includes a user processor 110, a user memory 120 connected to the user processor 110, a user interface 130 connected to the user processor 110, and a user communication unit 140 connected to the user processor 110.

The devices of the users 100 may be embodied as various types of computing devices, such as a desktop, a laptop, a tablet, a mobile device, or any other computing device known to those with ordinary skill in the art. In the embodiment shown in FIG. 1, all the user devices 100 have the same components, and the plurality of user devices 100 will be described in greater detail below with reference to a single user device 100. In various embodiments, each of the users of the population may have one of the user devices 100, each of the users of the population may have multiple of the user devices 100, or users of the population may have different numbers of user devices 100. In various embodiments, the devices of the users 100 may vary in type provided that they each have the user processor 110, the user memory 120, the user interface 130, and the user communication unit 140.

The user memory 120 is a non-transitory computer readable medium, such as read-only memory (ROM) or random-access memory (RAM), capable of storing program instructions thereon that are executable by the user processor 110 to perform the functions of the user processor 110 described herein. The user interface 130 is capable of receiving input data and outputting data and, in various embodiments, may be a display and keyboard, an input-output touch screen, or any type of computing interface known to those with ordinary skill in the art. The user communication unit 140 is capable of receiving and transmitting data to and from the user 100. In various embodiments, the user communication unit 140 may be capable of communicating over a wired connection, a wireless connection, by near field communication, or by any other data communication of computing devices known to those with ordinary skill in the art.

The cybersecurity system 200, as shown in FIG. 1, includes a system processor 210, a system memory 220 connected to the system processor 210, a system communication unit 230 connected to the system processor 210, and a database 240 connected to the system processor 210.

The system memory 220 is a non-transitory computer readable medium, such as ROM or RAM, capable of storing computer instructions thereon that are executable by the system processor 210 to perform the functions of the system processor 210 described herein.

The system communication unit 230 is capable of receiving and transmitting data to and from the cybersecurity system 200. In various embodiments, the system communication unit 230 may be capable of communicating over a wired connection, a wireless connection, by near field communication, or by any other data communication of computing devices known to those with ordinary skill in the art.

The database 240 is accessible by the system processor 210. The database 240 is a non-transitory computer readable medium capable of storing data that may be located either locally or remotely from the other elements of the cybersecurity system 200. The database 240, as shown in FIG. 1, stores a plurality of user records 242, a plurality of threat data 250, and a plurality of style data 260.

The user records 242, shown in FIG. 1, each correspond to one of the users 100. Each user record 242 includes a user identifier 244 and a cybersecurity style 246 stored in the user record 242 in correspondence with the user identifier 244. The user identifier 244 may be any type of data that is particular to one user 100 of the population of users 100. In various embodiments, for example, the user identifier 244 may be an account name or an identification number.

The cybersecurity style 246 is associated with the user 100 and is predetermined and pre-stored in the user record 242. The cybersecurity style 246 represents a plurality of personality traits of the user 100 that are indicative of a cybersecurity risk posed by the user 100. The personality traits of the user 100 are not explicitly cybersecurity-related, but instead are more basic personality traits of the user 100, for example a risk tolerance and a rule adherence of the user 100, that reflect the cybersecurity risk that may be posed by the user 100. The cybersecurity style 246 may be represented by one of a group of possible categories or may be represented by a numerical score or series of numerical scores.

In an embodiment, the cybersecurity style 246 is predetermined and pre-stored in the user record 242 once the user 100 has undergone an assessment that determines the cybersecurity style 246. The assessment, in this embodiment, is a plurality of prompts presented to the user 100 that include prompts directed to the risk tolerance of the user 100 and prompts directed to the rule adherence of the user 100; the prompts are not explicitly related to cybersecurity and measure the personality traits of the user in a context of detecting on-job behavior rather than general behavioral science terms or trait-based personality theories. For example, one of the prompts related to the risk tolerance of the user 100 is "The more perfect my work, the more I am respected for it" and one prompts relates to the rule adherence of the user 100 is "Keeping the customer satisfied is more important than following the rules . . . ". The resulting cybersecurity style 246 is a score and/or a category that is based on the responses of the user 100 to the prompts. In this embodiment, the cybersecurity style 246 may, for example, be determined according to the system and method set forth in U.S. Pat. No. 11,411,978, which is hereby incorporated by reference in its entirety. In other embodiments, the cybersecurity style 246 may be any measure of underlying personality traits of the user 100 that are indicative of a cybersecurity risk and/or behavioral inclination posed by the user 100. The population of users 100 will have a plurality of different cybersecurity styles 246 across the population.

The threat data 250 stored in the database 240, shown in FIG. 1, includes current information on cybersecurity threat volume, types, methods and trends. In an embodiment, the threat data 250 is updated frequently, for example in real-time, by obtaining the threat information from external sources through the network 300 via the system communication unit 230. In other embodiments, the threat data 250 stored in the database 240 can be updated less frequently. In other embodiments, the thread data 250 can be retrieved from an external source through the network 300 via the system communication unit 230 as needed instead of being stored in the database 240. In all embodiments, the threat data 250 reflects a current understanding of the most common types of cybersecurity threats and how they develop.

The style data 260 stored in the database 240, as shown in FIG. 1, includes a plurality of remediation and mitigation actions 262, a plurality of voicing data 264, a plurality of training sessions 266, and a plurality of cybersecurity interventions 268 targeted to specific threats types and associated risky user behaviors that create vulnerabilities exploited by third parties to attempt to breach the organizations security practices and defenses.

The remediation and mitigation actions 262 are a variety of actions that can be recommended to the user 100 to address various cybersecurity threats by remediating user vulnerability to the threat and/or mitigating the threat itself once detected. The remediation and mitigation actions 262 may be differentiated by a plurality of different cybersecurity styles 246; certain remediation and mitigation actions 262 may be stored in the style data 260 as more highly recommended or less recommended for certain cybersecurity styles 246. Various remediation and mitigation actions 262, for example in response to a phishing cybersecurity threat, may be to delete the suspected phishing message or to check information included in the phishing message, such as the email address or the sender. A less risk averse cybersecurity style 246, for example, may be given the remediation and mitigation action 262 to delete the phishing message, while a greater rule adherence cybersecurity style 246 may be given the remediation and mitigation action 262 to check the sender of the potential phishing message to determine whether it is a cybersecurity risk.

The voicing data 264 are various manners of presenting information to the users 100 that are differentiated by the plurality of different cybersecurity styles 246. The voicing data 264 may be a series of different templates or various sets of computer instructions that create different types of natural language messages for the different cybersecurity styles 246. For example, the voicing data 264 may be a command, may be a series of instructions to follow, or may frame an output to the user 100 in the form of a question. A less risk averse cybersecurity style 246, for example, may be associated with the voicing data 264 in the form of a question, while a greater rule adherence cybersecurity style 246 may be associated with voicing data 264 that is a command or a series of instructions to follow. Personalizing replies to user queries based on their underlying style 246 improves adoption and application of new security habits that reduce vulnerability and the cybersecurity risk posed by the user 100.

The plurality of training sessions 266 stored in the database 240 are a plurality of different types of training that can be sent to the users 100 pertaining to different types of cybersecurity threats. The training sessions 266, for example, can include a training on types of threats, a training on best practices, training particular to certain applications such as email, or any other type of training on aspects of cybersecurity known to those with ordinary skill in the art. The training sessions 266 are also differentiated by the plurality of different cybersecurity styles 246. For example, a training session 266 may focus on involving the user 100 in exploring and setting cybersecurity rules, focusing on the user 100 voluntarily adopting the rules before they follow the rules. Other training sessions 266 may focus on helping the user 100 understand a risk-reward tradeoff of following cybersecurity rules, or may focus on convincing the user 100 of a high risk of detection if they break cybersecurity rules.

The plurality of cybersecurity interventions 268 stored in the database 240 are a plurality of different actions that can be taken by the cybersecurity system 200 to limit the likelihood that the user 100 falls victim to a cybersecurity threat requiring careful consideration based on the user 100 having made a corresponding cybersecurity query 150 as described below. The cybersecurity interventions 268 are sets of installations that differ in an access, a control, and/or a monitoring for the user 100. The cybersecurity interventions 268, for example, can include software limiting access of the user 100 to the network 300, software limiting control of the user 100 of portions of the network 300, software monitoring keystrokes or screen scrapes of user 100 activity, or implementing stronger system access and control parameters for selected users 100 and including any other form of software, firmware, or hardware cybersecurity installation known to those with ordinary skill in the art. The cybersecurity interventions 268 are stored in association with a certain severity and/or a certain type of cybersecurity threat.

As shown in FIG. 1, the cybersecurity system 200 has a plurality of modules including a query module 270, a chatbot module 280, and a natural language module 290 that are each a set of functions, described in greater detail below, performed when a set of computer instructions stored on the system memory 220 are executed by the system processor 210. As described in detail below, the query module 270, the chatbot module 280, and the natural language module 290 interact to receive natural language queries from the users 100 related to cybersecurity and generate natural language cybersecurity responses in conversational chat form, along with implementing additional training or interventions where necessary.

The natural language module 290, as shown in FIG. 1, is connected to the chatbot module 280 and has a closed large language model ("LLM") 292 that is used for the natural language processing described below. As used herein, the terms "large language model," or "LLM" refer to data structures, programs, or the like that are designed to interpret natural language. LLMs may be considered to be neural networks that have been trained on large collections of natural language source documents to generate predictive responses based on provided prompts. The LLM 292 described herein is a closed LLM that is trained on a plurality of cybersecurity information sources and, more particularly, on a discrete and specifically curated set of selected cybersecurity sources 294 that are chosen based on their trusted and relevant data. The selected cybersecurity sources 294 are previously validated as being reliable information on which the organization would want the users 100 to rely. In an embodiment, the LLM 292 and specifically curated set of selected cybersecurity sources 294 are proprietary to the organization. The closed LLM 292 does not have a publicly available source code, does not freely draw additional information from the Internet for training of the LLM 292, and the data used to train the LLM 292 is not shared outside of the cybersecurity system 200; all queries that are processed through the LLM 292 and all replies that are generated through the LLM 292 remain confidential. The closed LLM 292 is self-contained within the cybersecurity system 200.

Figure 2:
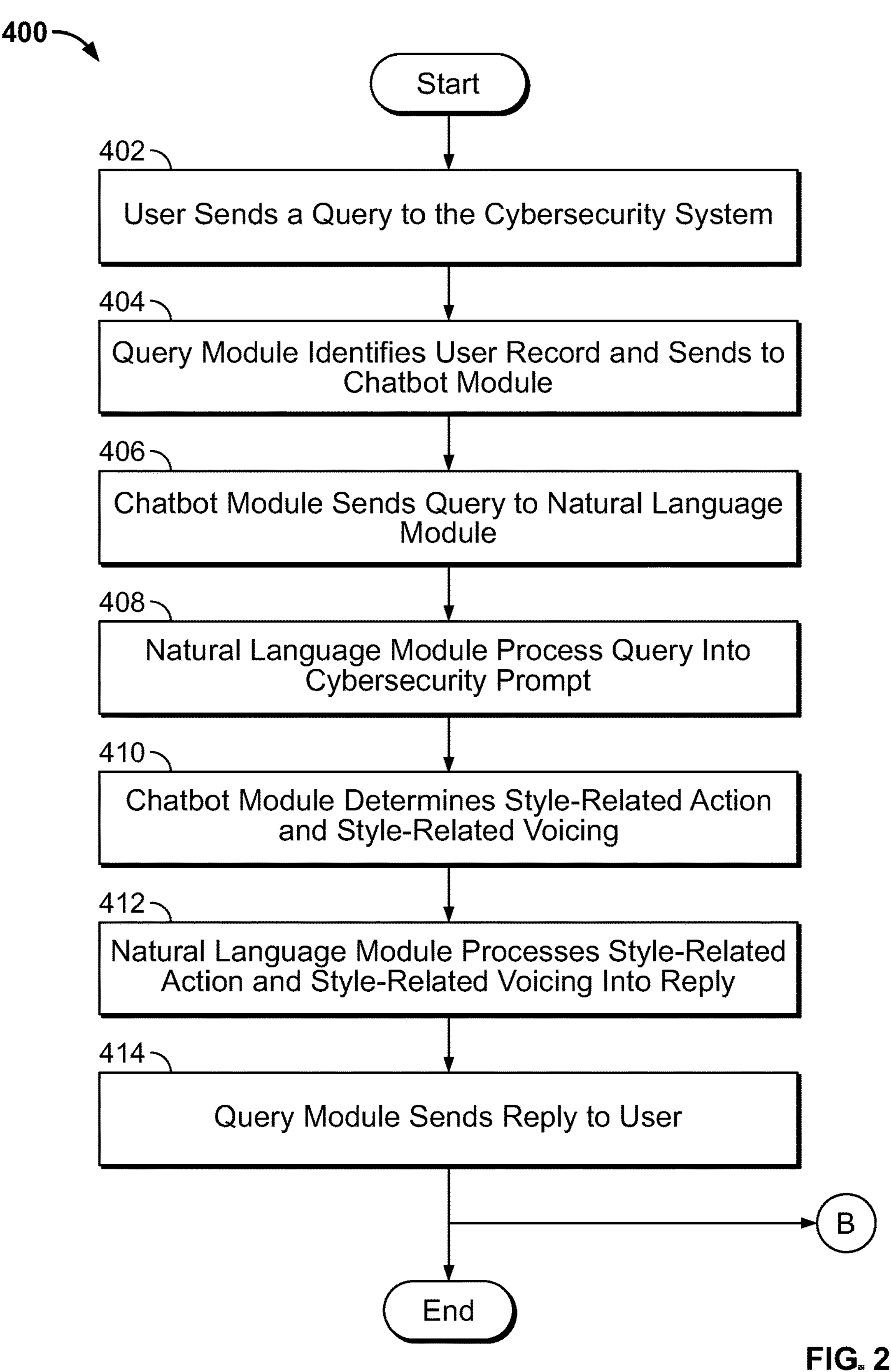
FIG. 2 is a flowchart of a first portion of a process for providing cybersecurity guidance and implementing cybersecurity interventions.
Figure 3:
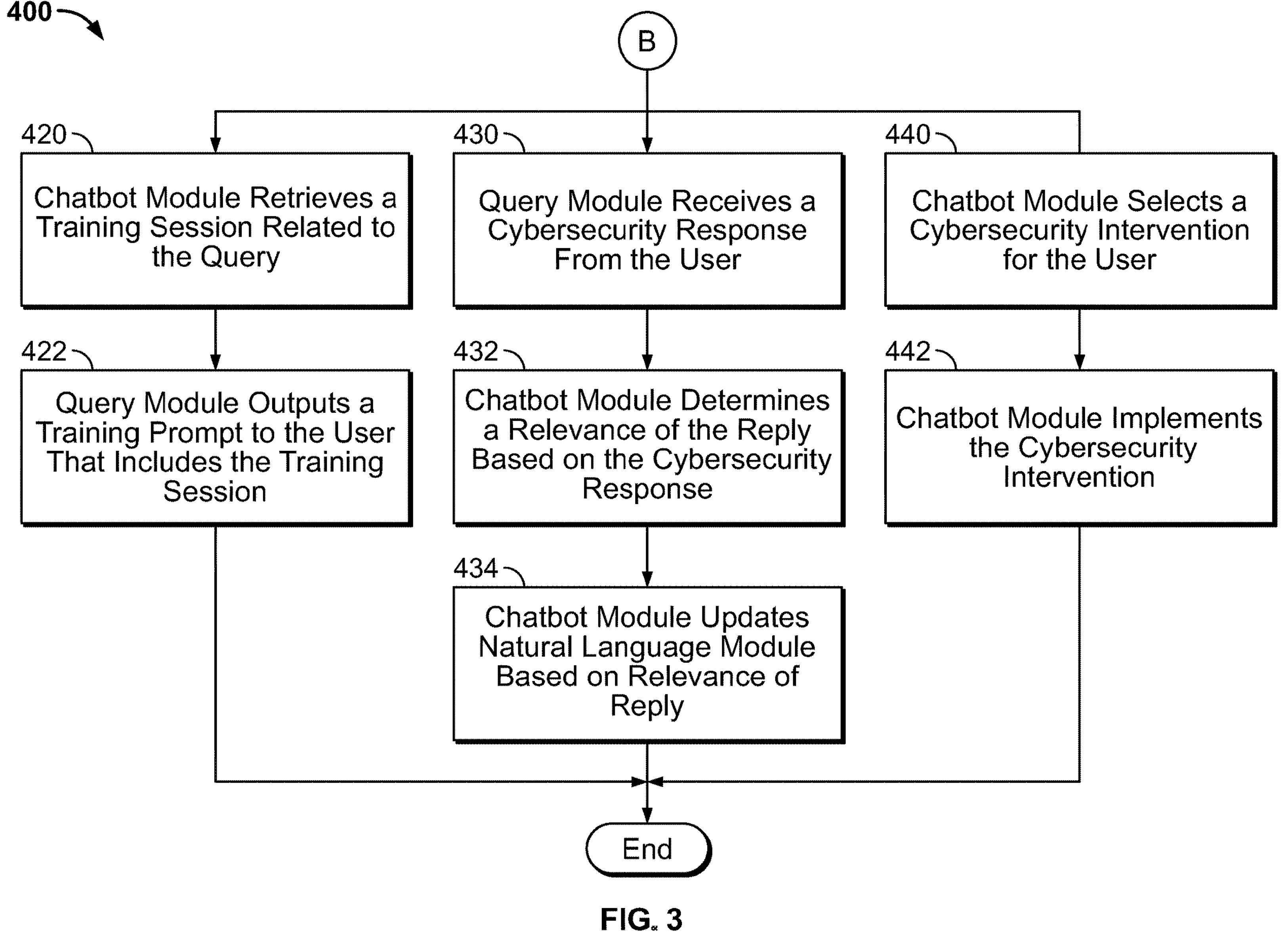
FIG. 3 is a flowchart of a second portion of the process for providing cybersecurity guidance and implementing cybersecurity interventions.

A process 400 for providing cybersecurity guidance and implementing cybersecurity interventions using the system of FIG. 1 is shown in FIGS. 2 and 3. The process 400 and interaction of the users 100 and the cybersecurity system 200 will now be described in greater detail. The process 400 will be described with respect to one of the users 100 but applies equally to all the users 100 in the population.

In a first step 402, shown in FIG. 2, the user 100 sends a cybersecurity query 150 to the cybersecurity system 200 through the network 300. The cybersecurity query 150 is related to a cybersecurity issue or question encountered by the user 100 and is presented in natural language. For example, in various embodiments, the cybersecurity query 150 may be "What is phishing?", "How do I know if I'm being phished?", or "Is this [attached message] a phishing attempt?". Although these examples are related to phishing, as also described elsewhere herein, the embodiments are not restricted to phishing but could be related to any type of cybersecurity threat. The user 100 enters the cybersecurity query 150 on the user interface 130 and the user processor 110 transmits the cybersecurity query 150 to the network 300 using the user communication unit 140.

As shown in FIG. 1, the cybersecurity query 150 includes a user identifier 160 that is particular to the user 100. The user identifier 160 corresponds to one of the plurality of user identifiers 244 stored in the user records 242 described above. As similarly described above, the user identifier 160 may be any type of data that is particular to one user 100 of the population of users 100. In various embodiments, for example, the user identifier 160 may be an account name or an identification number.

The cybersecurity query 150 is received by the cybersecurity system 200 through the network 300. In a step 404 shown in FIG. 2, the query module 270, by operation of the system communication unit 230 via the system processor 210, receives the cybersecurity query 150 from the network 300. The query module 270 determines the user identifier 160 in the cybersecurity query 150 and identifies the user record 242 in the database 240 that has the user identifier 244 corresponding to the user identifier 160 in the cybersecurity query 150. The query module 270 determines the cybersecurity style 246 of the user 100 in the identified user record 242 and sends the user record 242, with the particular identified cybersecurity style 246, to the chatbot module 280 along with the cybersecurity query 150.

The chatbot module 280 receives the cybersecurity query 150 and the user record 242 having the cybersecurity style 246 and, in a step 406 shown in FIG. 2, sends the cybersecurity query 150 to the natural language module 290 for processing. In the step 406, the cybersecurity query 150 is still in a natural language format.

The natural language module 290 connected to the chatbot module 280 receives the cybersecurity query 150 and, in a step 408 shown in FIG. 2, processes the cybersecurity query 150 into a cybersecurity prompt 296. The chatbot module 280 uses the natural language processing of the closed LLM 292 executed through the system processor 210 to interpret the natural language of the cybersecurity query 150 and extract the pertinent cybersecurity prompt 296 from the cybersecurity query 150. For example, from the cybersecurity query 150 of "Is this [attached message] a phishing attempt?", the natural language module 290 may extract the type of security threat (phishing), the relevant communication medium (email, video, or text), and other necessary information from the message (sender's address, grammar in text of the message, etc.), all of which is sent back to the chatbot module 280 as the data within the cybersecurity prompt 296, as shown in FIG. 1.

The chatbot module 280 receives the cybersecurity prompt 296 and compares the cybersecurity prompt 196 to the threat data 250 stored in the database 240 to determine other relevant information related to the particular type of cybersecurity threat contained within the cybersecurity prompt 196.

Based on this information, in a step 410 shown in FIG. 2, the chatbot module 280 compares the cybersecurity prompt 196 and the cybersecurity style 246 of the user 100 to the remediation and mitigation actions 262 in the style data 260. The chatbot module 280 selects one of the remediation and mitigation actions 262 related to the cybersecurity style 246 associated with the user 100 that is pertinent to the threat contained in the cybersecurity prompt 296 to determine a style-related action 284 for the user 100. For example, as described above, the style-related action 284 may be to check information included in the phishing message, such as the email address or the sender, for a user 100 having a greater rule adherence cybersecurity style 246.

Likewise, in the step 410 shown in FIG. 2, the chatbot module 280 compares the cybersecurity prompt 196 and the cybersecurity style 246 of the user 100 to the voicing data 264 in the style data 260. The chatbot module 280 selects a portion of the voicing data 264 related to the cybersecurity style 246 associated with the user 100 that is pertinent to the threat contained in the cybersecurity prompt 296 to determine a style-related voicing 286 for the user 100. For example, as described above, the style-related voicing 286 may be a command or a series of instructions to follow for a user 100 having a greater rule adherence cybersecurity style 246.

The chatbot module 180 sends the style-related action 284 and the style-related voicing 286 to the natural language module 290. In the step 412 shown in FIG. 2, the natural language module 290 processes the style-related action 284 and the style-related voicing 286 and generates a reply 282 that is a cohesive response in a natural language format. The reply 282 is based on the style-related action 284 and the style-related voicing 286. For example, for a user 100 having a greater rule adherence cybersecurity style 246 and encountering a phishing message as in the embodiment described above, the reply 282 may be "Check the sender's email address and determine if it is one you recognize or if it contains any misspellings".

The natural language module 290 sends the reply 282 to the chatbot module 280, which outputs the reply 282 shown in FIG. 1 to the user 100. The chatbot module 280 outputs the reply 282 through the query module 270, by operation of the system communication unit 230 via the system processor 210, in a step 414 shown in FIG. 2. The user 100 receives the reply 282 through the network 300 and the reply 282 is presented on the user interface 130, where the user 100 can understand the reply 282 and take any necessary action based on the information contained in the reply 282.

In various embodiments, the process 400 can have additional steps shown in FIG. 3 after the reply 282 is sent to the user 100.

The cybersecurity system 200 can recommend targeted training for the user 100 based on the cybersecurity query 150. In a step 420 shown in FIG. 3, the chatbot module 280 retrieves a training session related to the cybersecurity query 150 from the training sessions 266 in the database 240. For example, for the phishing messages described above, the chatbot module 280 can retrieve a training session 266 related to identifying phishing messages from the style data 260. The training session 266, as described above, can also be particular to the cybersecurity style 246 of the user 100 in addition to the threat posed in the cybersecurity query 150. In a step 422 shown in FIG. 3, the chatbot module 280 can output a training prompt 288, shown in FIG. 1, that includes the training session 266 to the user 100. The chatbot module 280 outputs the training prompt 288 through the query module 270, by operation of the system communication unit 230 via the system processor 210. The user 100 can access the training session 266 by engaging with the training prompt 288 on the user interface 130.

The user 100 can also respond to the reply 282 sent in the step 414 with a cybersecurity response 152, shown in FIG. 1. In a step 430 shown in FIG. 3, the query module 270, by operation of the system communication unit 230 via the system processor 210, receives the cybersecurity response 152 from the user 100 and sends the cybersecurity response 152 to the chatbot module 280. The chatbot module 280, through communication with the natural language module 290, determines a relevance of the reply 282 based on the cybersecurity response 152 in a step 432. For example, if the cybersecurity response 152 evidences a misunderstanding of the reply 282, such as a misunderstanding of the instructions in the reply 282, the chatbot module 280 can determine that the reply 282 was less relevant to the cybersecurity query 150. Conversely, if the cybersecurity response 152 evidences that the user 100 successfully executed the steps in the reply 282 or otherwise understood the reply 282, the chatbot module 280 can determine that the reply 282 was more relevant to the cybersecurity query 150. In a step 434 shown in FIG. 3, the chatbot module 280 can update the closed LLM 292 based on the determination of the relevance of the reply 282 in the step 432.

The cybersecurity system 200 can also implement cybersecurity interventions 268 based on the cybersecurity query 150 sent by the user 100. In a step 440, the chatbot module 280 selects a cybersecurity intervention 268 related to the cybersecurity query 150 from the cybersecurity interventions 268 in the database 240. For example, the chatbot module 280 can select a cybersecurity intervention 268 limiting access of the user 100 to the network 300 from the style data 260. The cybersecurity intervention 268 can be particular to the threat posed in the cybersecurity query 150 and depend on the susceptibility of the user 100 to the threat. In a step 442 shown in FIG. 3, the chatbot module 280 can implement the cybersecurity intervention 268, for example by restricting the user's access to the network 300.

The cybersecurity system 200 described above allows the users 100 to initiate cybersecurity queries 150 regarding questions of concern on demand and without needing to contact an internal department of the organization, thus making it a cybersecurity tool that is more likely to be used. Further, the cybersecurity system 200 presents the reply 282 to the user 100 in a manner that is tailored to the particular query 150 and to the particular cybersecurity style 246 of the user 100, optimizing both the user's understanding of the style-related action 284 contained in the reply 282 and the user's willingness to engage in the recommended action through the appropriate style-related voicing 286. The natural language processing that generates the reply 282 is also based on a closed LLM 292 trained on trusted cybersecurity sources 294, ensuring that the reply 282 contains reliable information and that any data contained in the cybersecurity query 150 remains confidential within the organization having the cybersecurity system 200.

In summary, there is provided a cybersecurity system and a method according to any one of the following numbered clauses:

Clause 1. A cybersecurity system, comprising:

a system processor; and a system memory connected to the system processor, the system processor implements a plurality of modules stored on the system memory including:

a query module receiving a cybersecurity query from a user and identifying a user record corresponding to the user, the user record including a cybersecurity style associated with the user that is predetermined and pre-stored in the user record, the cybersecurity style represents a plurality of personality traits of the user that are indicative of a cybersecurity risk posed by the user;

a chatbot module receiving the cybersecurity query and the cybersecurity style of the user; and a natural language module connected to the chatbot module and using natural language processing with reference to a plurality of cybersecurity information sources to determine a reply to the cybersecurity query in a natural language format, the chatbot module adjusts the reply according to the cybersecurity style of the user and outputs the reply to the user.

Clause 2. The cybersecurity system of Clause 1, wherein the natural language module has a large language model implemented as a trained neural network.

Clause 3. The cybersecurity system of Clause 1 or 2, wherein the cybersecurity information sources are restricted to a plurality of selected cybersecurity sources in the large language model.

Clause 4. The cybersecurity system of Clause 2 or 3, wherein the large language model is a closed large language model.

Clause 5. The cybersecurity system of Clause 2 or any claim dependent thereon, wherein the natural language module receives the cybersecurity query from the chatbot module and extracts a cybersecurity prompt from the cybersecurity query.

Clause 6. The cybersecurity system of any preceding Clause, further comprising a database storing the user record having the cybersecurity style and a plurality of style data.

Clause 7. The cybersecurity system of Clause 6, wherein the style data includes a plurality of remediation and mitigation actions and/or a plurality of voicing data.

Clause 8. The cybersecurity system of Clause 7, wherein the plurality of remediation and mitigation actions and/or the plurality of voicing data are differentiated by a plurality of different cybersecurity styles, the cybersecurity style associated with the user is one of the plurality of different cybersecurity styles.

Clause 9. The cybersecurity system of Clause 7 or 8, wherein the chatbot module selects one of the plurality of remediation and mitigation actions related to the cybersecurity style associated with the user and the cybersecurity prompt to determine a style-related action for the user.

Clause 10. The cybersecurity system of Clause 7, 8 or 9, wherein the chatbot module selects a portion of the voicing data related to the cybersecurity style associated with the user and the cybersecurity prompt to determine a style-related voicing for the user.

Clause 11. The cybersecurity system of Clause 10, wherein the natural language module generates a reply to the user based on the style-related action and the style-related voicing.

Clause 12. The cybersecurity system of any preceding Clause, wherein the reply includes a style-related action particular to the cybersecurity style of the user and a style-related voicing particular to the cybersecurity style of the user.

Clause 13. The cybersecurity system of any preceding Clause, wherein the plurality of personality traits include a risk tolerance and a rule adherence of the user.

Clause 14. The cybersecurity system of Clause 13, wherein the risk tolerance and the rule adherence of the user are determined from a plurality of prompts that are not explicitly related to cybersecurity.

Clause 15. The cybersecurity system of any preceding Clause, wherein the chatbot module retrieves a training session related to the cybersecurity query and outputs a training prompt to the user that includes the training session.

Clause 16. The cybersecurity system of any preceding Clause, wherein the chatbot module determines how relevant the reply is to the cybersecurity query based on a cybersecurity response received from the user.

Clause 17. The cybersecurity system of any preceding Clause, wherein the chatbot module implements a cybersecurity intervention for the user based on the cybersecurity query.

Clause 18. The cybersecurity system of Clause 17, wherein the cybersecurity intervention is one of a plurality of different sets of installations differing in at least one of an access, a control, and a monitoring for the user.

Clause 19. The cybersecurity system of any preceding Clause, wherein the cybersecurity system is connected to a user device of the user over a network.

Clause 20. The cybersecurity system of Clause 19, wherein the cybersecurity query is sent from the user device to the cybersecurity system over the network.

Clause 21. The cybersecurity system of Clause 19 or 20, wherein the cybersecurity intervention restricts access of the user device to the network or implements stronger system access and control parameters for the user device.

Clause 22. The cybersecurity system of any one of Clauses 19 to 21, wherein the chatbot module outputs the reply to the user by sending the reply over the network to the user device, and wherein the user device optionally displays the reply on a display device of the user device.

Clause 23. The cybersecurity system of any one of Clauses 19 to 22 when Clause 19 is appended to Clause 7 or any Clause dependent thereon, wherein the remediation and mitigation actions are recommendations that are sent by the chatbot module to the user device over the network to address various cybersecurity threats, wherein the user device optionally displays the remediation and mitigation actions on a display device of the user device.

Clause 24. The cybersecurity system of any one of Clauses 19 to 23 when Clause 19 is appended to Clause 7 or any Clause dependent thereon, wherein the voicing data personalizes the presentation of the reply to the user on the user device based on the cybersecurity style of the user.

Clause 25. The cybersecurity system of any one of Clauses 19 to 24 when Clause 19 is appended to Clause 15 or any Clause dependent thereon, wherein the chatbot module outputs the training prompt to the user by sending the training prompt over the network to the user device, and wherein the user device optionally displays the training session of the training prompt to the user on a display device of the user device to train the user on types of cybersecurity threats or best practices.

Clause 26. The cybersecurity system of any one of Clauses 19 to 25 when Clause 19 is appended to Clause 16 or any Clause dependent thereon, wherein the user device receives the cybersecurity response from the user and sends the cybersecurity response to the chatbot module over the network.

Clause 27. The cybersecurity system of Clause 16 or any Clause dependent thereon, wherein the chatbox module updates the large language model based on the relevance of the reply.

Clause 28. A method, comprising:

receiving a cybersecurity query from a user;

identifying a user record corresponding to the user, the user record including a cybersecurity style associated with the user that is predetermined and pre-stored in the user record, the cybersecurity style represents a plurality of personality traits of the user that are indicative of a cybersecurity risk posed by the user;

determining a reply to the cybersecurity query in a natural language format using natural language processing with reference to a plurality of cybersecurity information sources;

adjusting the reply according to the cybersecurity style of the user; and outputting the reply to the user.

Clause 29. The method of Clause 28, wherein a natural language module performs the natural language processing, the natural language module is a closed large language model and the cybersecurity information sources are restricted to a plurality of selected cybersecurity sources.

Clause 30. The method of Clause 28 or 29, wherein the reply is adjusted to include a style-related action of a plurality of remediation and mitigation actions that is particular to the cybersecurity style of the user.

Clause 31. The method of Clause 28, 29 or 30, wherein the reply is adjusted to include a style-related voicing of a plurality of voicing data that is particular to the cybersecurity style of the user.

What is claimed is:

1. A cybersecurity system, comprising:

a system processor; and a system memory connected to the system processor, the system processor executes a plurality of program instructions stored on the system memory including:

a query module receiving a cybersecurity query from a user and identifying a user record corresponding to the user, the user record including a cybersecurity style associated with the user that is predetermined and pre-stored in the user record, the cybersecurity style represents a plurality of personality traits of the user that are indicative of a cybersecurity risk posed by the user;

a chatbot module receiving the cybersecurity query and the cybersecurity style of the user; and a natural language module connected to the chatbot module and using natural language processing with reference to a plurality of cybersecurity information sources to determine a reply to the cybersecurity query in a natural language format, the chatbot module adjusts the reply according to the cybersecurity style of the user and outputs the reply to the user.

2. The cybersecurity system of claim 1, wherein the natural language module has a closed large language model.

3. The cybersecurity system of claim 2, wherein the cybersecurity information sources are restricted to a plurality of selected cybersecurity sources in the closed large language model.

4. The cybersecurity system of claim 2, wherein the natural language module receives the cybersecurity query from the chatbot module and extracts a cybersecurity prompt from the cybersecurity query.

5. The cybersecurity system of claim 4, further comprising a database storing the user record having the cybersecurity style and a plurality of style data, the style data including a plurality of remediation and mitigation actions and a plurality of voicing data.

6. The cybersecurity system of claim 5, wherein the plurality of remediation and mitigation actions and the plurality of voicing data are differentiated by a plurality of different cybersecurity styles, the cybersecurity style associated with the user is one of the plurality of different cybersecurity styles.

7. The cybersecurity system of claim 5, wherein the chatbot module selects one of the plurality of remediation and mitigation actions related to the cybersecurity style associated with the user and the cybersecurity prompt to determine a style-related action for the user.

8. The cybersecurity system of claim 7, wherein the chatbot module selects a portion of the voicing data related to the cybersecurity style associated with the user and the cybersecurity prompt to determine a style-related voicing for the user.

9. The cybersecurity system of claim 8, wherein the natural language module generates a reply to the user based on the style-related action and the style-related voicing.

10. The cybersecurity system of claim 1, wherein the reply includes a style-related action particular to the cybersecurity style of the user and a style-related voicing particular to the cybersecurity style of the user.

11. The cybersecurity system of claim 1, wherein the plurality of personality traits include a risk tolerance and a rule adherence of the user.

12. The cybersecurity system of claim 11, wherein the risk tolerance and the rule adherence of the user are determined from a plurality of prompts that are not explicitly related to cybersecurity.

13. The cybersecurity system of claim 1, wherein the chatbot module retrieves a training session related to the cybersecurity query and outputs a training prompt to the user that includes the training session.

14. The cybersecurity system of claim 1, wherein the chatbot module determines a relevance of the reply based on a cybersecurity response received from the user.

15. The cybersecurity system of claim 1, wherein the chatbot module implements a cybersecurity intervention for the user based on the cybersecurity query.

16. The cybersecurity system of claim 15, wherein the cybersecurity intervention is one of a plurality of different sets of installations differing in an access, a control, and/or a monitoring for the user.

17. A method, comprising:

receiving a cybersecurity query from a user;

identifying a user record corresponding to the user, the user record including a cybersecurity style associated with the user that is predetermined and pre-stored in the user record, the cybersecurity style represents a plurality of personality traits of the user that are indicative of a cybersecurity risk posed by the user;

determining a reply to the cybersecurity query in a natural language format using natural language processing with reference to a plurality of cybersecurity information sources;

adjusting the reply according to the cybersecurity style of the user; and outputting the reply to the user.

18. The method of claim 17, wherein a natural language module performs the natural language processing, the natural language module is a closed large language model and the cybersecurity information sources are restricted to a plurality of selected cybersecurity sources.

19. The method of claim 17, wherein the reply is adjusted to include a style-related action of a plurality of remediation and mitigation actions that is particular to the cybersecurity style of the user.

20. The method of claim 17, wherein the reply is adjusted to include a style-related voicing of a plurality of voicing data that is particular to the cybersecurity style of the user.

* * * * *